(12) United States Patent
Amnon et al.

(10) Patent No.: US 8,904,542 B2
(45) Date of Patent: *Dec. 2, 2014

(54) SYSTEM, METHOD AND COMPUTER READABLE MEDIUM FOR EVALUATING POTENTIAL ATTACKS OF WORMS

(71) Applicant: Skybox Security Inc., San Jose, CA (US)

(72) Inventors: Lotem Amnon, Ramot Hashavim (IL); Gideon Cohen, Palo Alto, CA (US); Moshe Meiseles, Hod Hasharon (IL); Ilan Horn, Givat Ada (IL)

(73) Assignee: Skybox Security Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,807

(22) Filed: Jan. 20, 2013

(65) Prior Publication Data

US 2013/0219503 A1 Aug. 22, 2013

Related U.S. Application Data

(63) Continuation of application No. 11/829,980, filed on Jul. 30, 2007, now Pat. No. 8,359,650, which is a continuation-in-part of application No. 10/262,648, filed on Oct. 1, 2002, now Pat. No. 6,952,779, and a continuation-in-part of application No. 11/420,588, filed on May 26, 2006, now Pat. No. 8,239,951.

(60) Provisional application No. 60/820,959, filed on Aug. 1, 2006.

(51) Int. Cl.
| | | |
|---|---|---|
| G06F 11/30 | (2006.01) | |
| G06F 12/14 | (2006.01) | |
| G06F 12/16 | (2006.01) | |
| G08B 23/00 | (2006.01) | |
| H04L 29/06 | (2006.01) | |
| G06F 21/55 | (2013.01) | |

(52) U.S. Cl.
CPC .......... *H04L 63/1433* (2013.01); *G06F 21/55* (2013.01)
USPC ................ 726/25; 726/23; 713/188

(58) Field of Classification Search
USPC .......................................... 726/25
See application file for complete search history.

(56) References Cited

U.S. PATENT DOCUMENTS

| | | | | |
|---|---|---|---|---|
| 5,675,711 | A * | 10/1997 | Kephart et al. ................. | 706/12 |
| 6,016,546 | A * | 1/2000 | Kephart et al. ................. | 726/24 |
| 6,088,804 | A * | 7/2000 | Hill et al. ........................ | 726/25 |
| 6,185,689 | B1 * | 2/2001 | Todd et al. ...................... | 726/25 |
| 6,253,337 | B1 * | 6/2001 | Maloney et al. ........... | 714/38.14 |
| 6,282,546 | B1 * | 8/2001 | Gleichauf et al. .............. | 726/25 |
| 6,301,668 | B1 * | 10/2001 | Gleichauf et al. .............. | 726/25 |

(Continued)

FOREIGN PATENT DOCUMENTS

| | | | | |
|---|---|---|---|---|
| EP | | 896285 A1 * | 2/1999 | ............ G06F 17/30 |
| WO | WO 2004031953 A1 * | | 4/2004 | ............ G06F 11/30 |

*Primary Examiner* — Carolyn B Kosowski
(74) *Attorney, Agent, or Firm* — Oren Reches

(57) ABSTRACT

A method for evaluating potential attacks of worms, the method includes: associating, in response to information representative of a network and of worm entities, between worm entities and potential worm sources to provide associated worm sources; determining potential worm attacks that start from the associated worm sources; and evaluating at least one potential worm attack security metric associated with the potential worm attacks.

20 Claims, 3 Drawing Sheets

(56) References Cited

U.S. PATENT DOCUMENTS

| | | | | |
|---|---|---|---|---|
| 6,324,656 B1 * | | 11/2001 | Gleichauf et al. | 714/37 |
| 6,535,227 B1 * | | 3/2003 | Fox et al. | 715/736 |
| 6,546,493 B1 * | | 4/2003 | Magdych et al. | 726/25 |
| 6,735,702 B1 * | | 5/2004 | Yavatkar et al. | 726/13 |
| 6,895,383 B2 * | | 5/2005 | Heinrich | 705/7.28 |
| 6,988,208 B2 * | | 1/2006 | Hrabik et al. | 726/23 |
| 7,010,696 B1 * | | 3/2006 | Cambridge et al. | 713/188 |
| 7,013,395 B1 * | | 3/2006 | Swiler et al. | 726/25 |
| 7,016,980 B1 * | | 3/2006 | Mayer et al. | 709/249 |
| 7,089,303 B2 * | | 8/2006 | Sheymov et al. | 709/224 |
| 7,107,619 B2 * | | 9/2006 | Silverman | 726/27 |
| 7,293,287 B2 * | | 11/2007 | Fischman et al. | 726/22 |
| 7,293,290 B2 * | | 11/2007 | Szor | 726/24 |
| 7,305,709 B1 * | | 12/2007 | Lymer et al. | 726/25 |
| 7,340,776 B2 * | | 3/2008 | Zobel et al. | 726/24 |
| 7,373,664 B2 * | | 5/2008 | Kissel | 726/22 |
| 7,373,667 B1 * | | 5/2008 | Millard | 726/24 |
| 7,409,720 B1 * | | 8/2008 | Cambridge et al. | 726/24 |
| 7,472,421 B2 * | | 12/2008 | Cummins | 726/25 |
| 7,509,680 B1 * | | 3/2009 | Sallam | 726/24 |
| 7,530,104 B1 * | | 5/2009 | Thrower et al. | 726/22 |
| 7,530,105 B2 * | | 5/2009 | Gilbert et al. | 726/22 |
| 7,530,106 B1 * | | 5/2009 | Zaitsev et al. | 726/24 |
| 7,552,480 B1 * | | 6/2009 | Voss | 726/25 |
| 7,574,740 B1 * | | 8/2009 | Kennis | 726/22 |
| 7,603,711 B2 * | | 10/2009 | Scheidell | 726/24 |
| 7,603,715 B2 * | | 10/2009 | Costa et al. | 726/25 |
| 7,607,170 B2 * | | 10/2009 | Chesla | 726/22 |
| 7,624,447 B1 * | | 11/2009 | Horowitz et al. | 726/23 |
| 7,624,450 B1 * | | 11/2009 | Lymer et al. | 726/25 |
| 7,681,235 B2 * | | 3/2010 | Chesla et al. | 726/23 |
| 7,712,136 B2 * | | 5/2010 | Sprosts et al. | 726/24 |
| 7,712,138 B2 * | | 5/2010 | Zobel et al. | 726/25 |
| 7,743,421 B2 * | | 6/2010 | Cosquer et al. | 726/25 |
| 7,779,467 B2 * | | 8/2010 | Choi et al. | 726/22 |
| 7,865,956 B1 * | | 1/2011 | Cambridge et al. | 726/24 |
| 7,895,448 B1 * | | 2/2011 | Satish | 713/188 |
| 7,971,256 B2 * | | 6/2011 | Bhikkaji et al. | 726/24 |
| 8,117,654 B2 * | | 2/2012 | Jung et al. | 726/22 |
| 8,171,553 B2 * | | 5/2012 | Aziz et al. | 726/24 |
| 8,201,257 B1 * | | 6/2012 | Andres et al. | 726/25 |
| 2003/0009696 A1 * | | 1/2003 | Bunker V. et al. | 713/201 |
| 2003/0051049 A1 * | | 3/2003 | Noy et al. | 709/238 |
| 2003/0195861 A1 * | | 10/2003 | McClure et al. | 707/1 |
| 2005/0021740 A1 * | | 1/2005 | Bar et al. | 709/224 |
| 2005/0091533 A1 * | | 4/2005 | Omote et al. | 713/201 |
| 2006/0010389 A1 * | | 1/2006 | Rooney et al. | 715/736 |
| 2006/0021050 A1 * | | 1/2006 | Cook et al. | 726/25 |
| 2006/0095970 A1 * | | 5/2006 | Rajagopal et al. | 726/25 |
| 2006/0291490 A1 * | | 12/2006 | Omote et al. | 370/401 |
| 2007/0067842 A1 * | | 3/2007 | Greene et al. | 726/24 |
| 2007/0083929 A1 * | | 4/2007 | Sprosts et al. | 726/22 |
| 2007/0083931 A1 * | | 4/2007 | Spiegel et al. | 726/24 |
| 2007/0094730 A1 * | | 4/2007 | Bhikkaji et al. | 726/24 |
| 2010/0115618 A1 * | | 5/2010 | Lee et al. | 726/23 |
| 2011/0191847 A1 * | | 8/2011 | Davis et al. | 726/22 |

* cited by examiner

US 8,904,542 B2

SYSTEM, METHOD AND COMPUTER READABLE MEDIUM FOR EVALUATING POTENTIAL ATTACKS OF WORMS

RELATED APPLICATIONS

This application is a continuation of U.S. application Ser. No. 11/829,980, filed Jul. 30, 2007, now U.S. Pat. No. 8,359, 650 issued Jan. 22, 2013, which is a CONTINUATION-IN-PART of U.S. application Ser. No. 11/420,588, filed 26 May 2006, which is a CONTINUATION-IN-PART of U.S. application Ser. No. 11/118,308, filed 28 Apr. 2005, which is a CONTINUATION of U.S. application Ser. No. 10/262,648, filed 1 Oct. 2002, now U.S. Pat. No. 6,952,779, issued 4 Oct. 2005. The disclosures of all of these patents and applications are incorporated herein by reference.

BACKGROUND OF THE INVENTION

Computer networks are almost constantly under the risk of computer worm (also referred to as worm) attacks. A worm is a self-replicating computer program (code) which can use the network to send copies of itself to other hosts in the networks, doing it without any human intervention. The spread of a worm usually involves exploiting a vulnerability that exists on the target node.

A vulnerability is a weakness of a computer or another device caused, for example, by software bugs or mis-configurations.

The exploitation of vulnerabilities can enable the worm to remotely achieve some level of control on the target node, a control which is used by the worm for infecting the target node with a copy of itself.

Worms might also combine in their propagation methods, other methods which require human intervention such as mass-mailing and infection through a malicious web site. In that way desktops and laptops that were infected by a worm (for example, via email) might be the source for a self propagation of the worm within the network of an organization. The Internet and connections of the computer network of an organization to other networks might be also the source for a worm attack on the network of the organization.

Worms might affect the network and its nodes by consuming bandwidth, installing their code and the code of backdoors on network nodes, performing DDoS attacks, removing files, encrypting files, sending documents found on a network node using e-mail, sending spam, etc.

Security personnel and network administrators try to secure their networks, by using various counter measures such as patching services known to include vulnerabilities, limiting access using firewalls and access rules within routers, installing intrusion prevention systems (IPS), and other protection mechanisms.

Security personnel and network administrators however, have very limited information on how vulnerable is their network to worms—the worm which has just been released and reported in the world in the last hours, or the worms that might be released in the next weeks or months.

They also have very partial tools to understand what current weaknesses in their network are more important to be resolved to effectively reduce the risk of potential worms.

There is a growing need to provide efficient methods, system and computer program products for evaluating consequences and risks of potential work attacks.

SUMMARY OF THE INVENTION

A method for evaluating potential attacks of worms, the method includes: associating, in response to information representative of a network and of worm entities, between worm entities and potential worm sources to provide associated worm sources; determining potential worm attacks that start from the associated worm sources; and evaluating at least one potential worm attack security metric associated with the potential worm attacks.

Conveniently, worm entities include worms and potential worms.

Conveniently, information representative of worm entities comprises at least one profile of at least one group of potential worms.

Conveniently, the method further includes generating information representative of a worm entity by modeling known worms.

Conveniently, the method further includes generating information representative of a worm entity by calculating a profile of a group of potential worms; wherein a profile of a group of potential worms is less detailed than at least one profile of a known worm.

Conveniently, the method includes generating information representative of potential worms capable of exploiting already published vulnerabilities based upon vulnerability attributes.

Conveniently, the method includes generating information representative of potential worms capable of exploiting vulnerabilities that are not published.

Conveniently, the method includes generating information representative of potential worms capable of exploiting vulnerabilities that are not published based upon service attributes.

Conveniently, the method includes identifying security weaknesses in response to the at least one potential worm attack security metric.

Conveniently the method includes prioritizing the identified security weaknesses.

Conveniently, the method includes prioritizing identified security weaknesses that comprise a vulnerability that facilitates a worm attack, an access possibility that permits a worm attack.

Conveniently, the method includes providing an indication about at least one device that enabled an access that was utilized during a worm attack.

Conveniently, the method includes amending information representative of the network in response to a selected security improvement action and repeating the stages of associating, determining and evaluating.

Conveniently, the determining of potential worm attacks includes evaluating a propagation of worm entities through network nodes while using vulnerabilities of these network nodes and evaluating possible infection of target nodes connected to network nodes through which the worm propagates.

Conveniently, a worm source is connected via an intermediate node to a target node and the evaluating is responsive to: (i) a likelihood of an existence of a worm entity, (ii) a likelihood of a worm source to be infected by the worm entity, (iii) a likelihood of the intermediate node to be attacked by the worm source and be infected by the worm entity, (iv) a likelihood of the target node to be attacked by the intermediate node and be infected by the worm entity.

Conveniently, a worm source is connected via multiple intermediate nodes to a target node; and the evaluating is responsive to: (i) a likelihood of an existence of a worm entity, (ii) a likelihood of a worm source to be infected by a worm entity, (iii) a likelihood of each of the intermediates node to be attacked by a previous node the worm source and be infected by the worm entity, (iv) a likelihood of the target node to be attacked by the intermediate node and be infected by the worm entity.

Conveniently, the evaluating is further responsive to an impact of a successful worm attack.

Conveniently, the evaluating is further responsive to at least one of the following: (i) business assets imposed risk, (ii) network infrastructure risk, and (iii) worm infection risk related to recovery costs.

Conveniently, the associating is responsive to at least one of the following: a worm source type, likelihood of occurrence of a potential worm, relevancy of a worm to the network.

Conveniently, the method includes performing access analysis from each infected host in the network; wherein the access analysis comprises simulating a provision of worm-generated packets.

Conveniently, the simulating further includes determining a maximal number of worm generated packets in response to a number of Internet Protocol addresses allowed by filtering devices.

A computer program product including a computer usable medium including a computer readable program, wherein the computer readable program when executed on a computer causes the computer to: associate, in response to information representative of a network and of worm entities, between worm entities and potential worm sources to provide associated worm sources; determine potential worm attacks that start from the associated worm sources; and evaluate at least one potential worm attack security metric associated with the potential worm attacks.

Conveniently, the worm entities include worms and potential worms.

Conveniently, information representative of worm entities includes at least one profile of at least one group of potential worms.

Conveniently, the computer readable program when executed on a computer causes the computer to generate information representative of a worm entity by modeling known worms.

Conveniently, the computer readable program when executed on a computer causes the computer to generate information representative of a worm entity by calculating a profile of a group of potential worms; wherein a profile of a group of potential worms is less detailed than at least one profile of a known worm.

Conveniently, the computer readable program when executed on a computer causes the computer to generate information representative of potential worms capable of exploiting already published vulnerabilities based upon vulnerability attributes.

Conveniently, the computer readable program when executed on a computer causes the computer to generate information representative of potential worms capable of exploiting vulnerabilities that are not published.

Conveniently, the computer readable program when executed on a computer causes the computer to generate information representative of potential worms capable of exploiting vulnerabilities that are not published based upon service attributes.

Conveniently, the computer readable program when executed on a computer causes the computer to identify security weaknesses in response to the at least one potential worm attack security metric.

Conveniently, the computer readable program when executed on a computer causes the computer to prioritize the identified security weaknesses.

Conveniently, the computer readable program when executed on a computer causes the computer to prioritize identified security weaknesses that comprise a vulnerability that facilitates a worm attack, an access possibility that permits a worm attack.

Conveniently, the computer readable program when executed on a computer causes the computer provide an indication about at least one device that enabled an access that was utilized during a worm attack.

Conveniently, the computer readable program when executed on a computer causes the computer to amend information representative of the network in response to a selected security improvement action and repeating the stages of associating, determining and evaluating.

Conveniently, the computer readable program when executed on a computer causes the computer to evaluate a propagation of worm entities through network nodes while using vulnerabilities of these network nodes and evaluating possible infection of target nodes connected to network nodes through which the worm propagates.

Conveniently, a worm source is connected via an intermediate node to a target node; wherein the computer readable program when executed on a computer causes the computer to evaluate in response to: (i) a likelihood of an existence of a worm entity, (ii) a likelihood of a worm source to be infected by the worm entity, (iii) a likelihood of the intermediate node to be attacked by the worm source and be infected by the worm entity, (iv) a likelihood of the target node to be attacked by the intermediate node and be infected by the worm entity.

Conveniently, a worm source is connected via multiple intermediate nodes to a target node and wherein the computer readable program when executed on a computer causes the computer to evaluate in response to: (i) a likelihood of an existence of a worm entity, (ii) a likelihood of a worm source to be infected by a worm entity, (iii) a likelihood of each of the intermediates node to be attacked by a previous node the worm source and be infected by the worm entity, (iv) a likelihood of the target node to be attacked by the intermediate node and be infected by the worm entity.

Conveniently, the computer readable program when executed on a computer causes the computer to evaluate in response to an impact of a successful worm attack.

Conveniently, the computer readable program when executed on a computer causes the computer to evaluate in response to at least one of the following: (i) business assets imposed risk, (ii) network infrastructure risk, and (iii) worm infection risk related to recovery costs.

Conveniently, the computer readable program when executed on a computer causes the computer to associate in response to at least one of the following: a worm source type, likelihood of occurrence of a potential worm, relevancy of a worm to the network.

Conveniently, the computer readable program when executed on a computer causes the computer perform access analysis from each infected host in the network; wherein the access analysis comprises simulating a provision of worm-generated packets.

Conveniently, the computer readable program when executed on a computer causes the computer to determine a maximal number of worm generated packets in response to a number of Internet Protocol addresses allowed by filtering devices.

A system for evaluating potential attacks of worms, the system includes: a memory unit adapted to store information representative of a network and of worm entities; and a processor adapted to: associate, in response to the information representative of a network and of worm entities, between worm entities and potential worm sources to provide associated worm sources; determine potential worm attacks that start from the associated worm entities; and evaluate at least one potential worm attack security metric associated with the potential worm attacks.

Conveniently, the processor is adapted to generate information representative of a worm entity by calculating a profile of a group of potential worms; wherein a profile of a group of potential worms is less detailed than at least one profile of a known worm.

Conveniently, the processor is adapted to identify security weaknesses in response to the at least one potential worm attack security metric.

Conveniently, the processor is adapted to prioritize the identified security weaknesses.

Conveniently, the processor is adapted to determine of potential worm attacks comprises evaluating a propagation of worm entities through network nodes while using vulnerabilities of these network nodes and evaluating possible infection of target nodes connected to network nodes through which the worm propagates.

Conveniently, a worm source is connected via multiple intermediate nodes to a target node; wherein the processor is adapted to evaluate in response to: (i) a likelihood of an existence of a worm entity, (ii) a likelihood of a worm source to be infected by a worm entity, (iii) a likelihood of each of the intermediates node to be attacked by a previous node the worm source and be infected by the worm entity, (iv) a likelihood of the target node to be attacked by the intermediate node and be infected by the worm entity.

BRIEF DESCRIPTION OF THE DRAWINGS

The invention is illustrated in the figures of the accompanying drawings which are meant to be exemplary and not limiting, in which like references are intended to refer to like or corresponding parts and in which.

DESCRIPTION OF THE PREFERRED EMBODIMENTS

Various embodiments of methods and computer programs according to this invention are described through reference to the figures.

The following are examples and illustrations relating to the terms used herein, and are not intended to be limiting of the scope of such terms. The term "network", as used herein, whether itself or in association with other terms, generally includes or refers to not only a network as a whole, but also any components or aspects thereof, such as network nodes, groups of network nodes, or components or aspects of network nodes, as well as services, applications, hardware, hardware components, software, software components, and the like, associated with the network or any component or aspect thereof, as well as any associated configurations. The term, "network service," and similar terms, as used herein, generally includes any software, software components, applications, operating systems, and the like, associated with the network, its nodes, or any other component or aspect of the network, as well as associated configurations, including service configurations, and including services that can be activated from or in association with network nodes. The term, "network model," and similar terms, as used herein, generally includes a variety of types of information relating to the network or any components or aspects thereof, such as network nodes, and includes configurations of or associated with network devices (firewalls, routers, load balancer, IPS, worm protecting systems, etc.) computers, software, software components, applications, operating systems, and the like, including network services information and network topology information.

The term "worm entity" as used herein, whether itself or in association with other terms, generally includes or refers to a worm or to a potential worm. A worm entity can be represented by various types of information. The terms "profile" and "specification" are used herein in a synonyms manner. A "worm attack" as used herein, whether itself or in association with other terms generally includes to an actual attack, a virtual attack and a simulated attack by a worm entity.

The terms "data" and information" are used herein in a synonyms manner.

The invention describes a system method and computer readable medium for evaluating consequences and risks of potential worm attacks, and for identifying and prioritizing worm related security weaknesses in the network.

Figure 1:
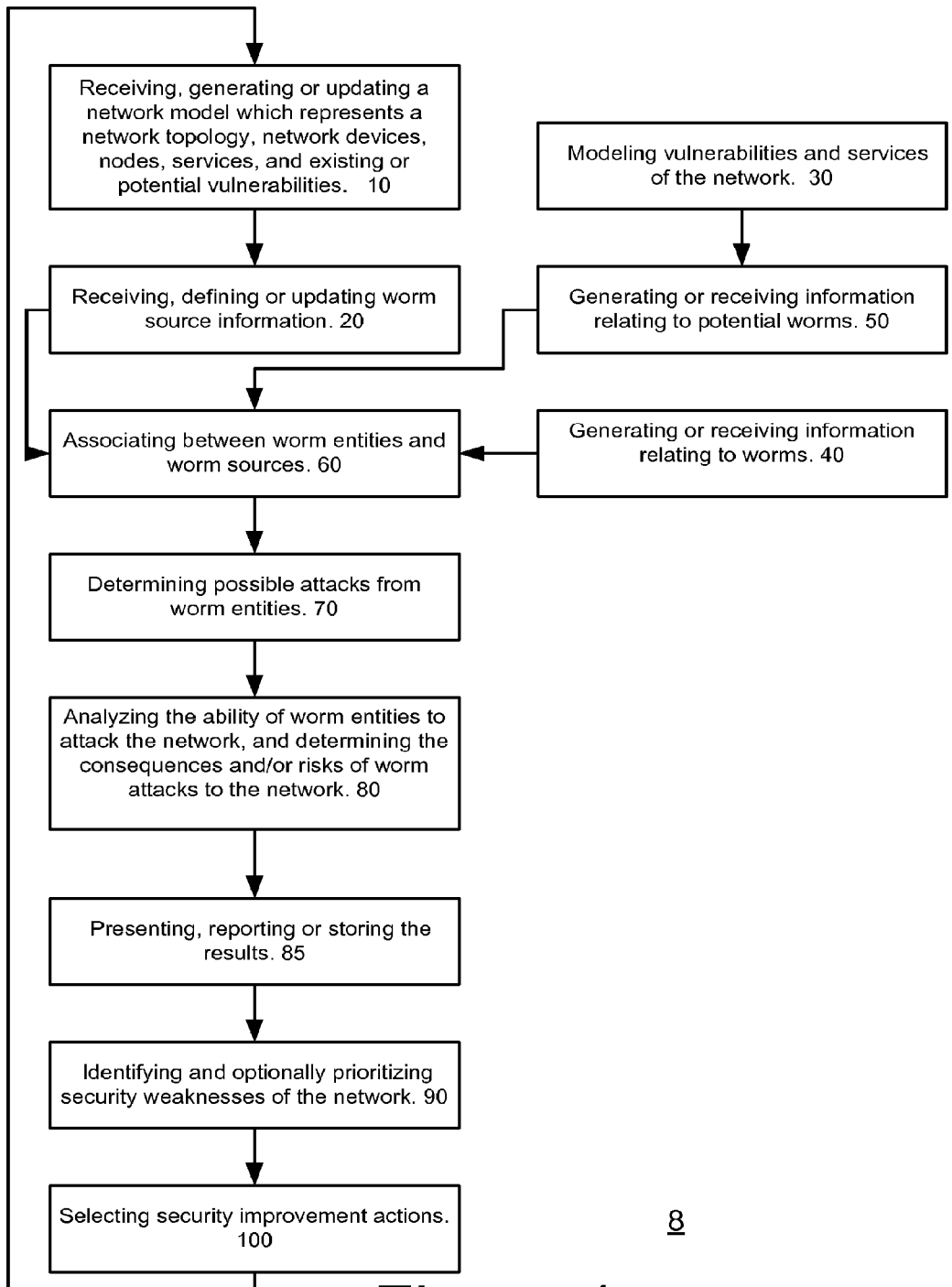
FIG. 1 is a flow chart of a method in accordance with one embodiment of the present invention.

FIG. 1 illustrates method 8 according to an embodiment of the invention. It is noted that method 8 includes multiple stages and that some of these stages are optional, some can be replaced by other stages and that additional stages can be added to method 8 without departing from the scope of the invention.

Method 8 evaluates potential attacks of worms and their possible impact, possible risk or other potential worm attack security metrics in relation to a model of a certain network. The method can provide an indication about the security level of that network in relation to known worms and potential worms.

Method 8 starts by stages 10, 30 and 40.

Stage 10 includes receiving, generating or updating a network model which represents a network topology, network devices, nodes, services, and existing or potential vulnerabilities. Stage 10 is followed by stage 20.

Stage 30 includes modeling vulnerabilities and services of the network. Stage 30 is followed by stage 50.

Stage 40 includes generating or receiving information relating to worms. This may include modeling the worms. A model can represent one worm or a group of worms. Typically, information representative of a group of worms is less detailed than information representative of a specific worm. This generalization enables to calculate possible security metrics in response to a group of worms. This generalization can reduce the complexity of the evaluation process. It is noted that these worms can include recently released worms, but this is not necessarily so. Stage 40 is followed by stage 60.

Stage 50 includes generating or receiving information relating to potential worms. Typically, this information is less detailed than information relating to specific known worms. A potential worm profile can include less information than an "actual" worm profile, as some of the potential worm characteristics are unknown at the moment that the profile is generated. Stage 50 is followed by stage 60.

Stage 20 includes receiving, defining or updating worm source information. Stage 20 is followed by stage 60.

Stage 60 includes associating between worm entities and worm sources. The worm sources can belong to the network or connected to the networks. Stage 60 is followed by stage 70 of determining possible attacks from worm entities.

Stage 70 is followed by stage 80 of evaluating (also referred to as determining) one or more worm related security metric. The security metrics can include (or indicate) the risk imposed by possible attacks from worm entities.

Stage 80 may include analyzing the ability of worm entities to attack the network, and determining the consequences and/or risks of worm attacks to the network.

Stage 80 may include determining potential worm attacks that start from the associated worm entities and evaluating at least one potential worm attack security metric associated with the potential worm attacks. Stage 80 may include evaluating a propagation of worm entities through network nodes while using vulnerabilities of these network nodes and evaluating possible infection of target nodes connected to network nodes through which the worm propagates.

If, for example, a worm source is connected via an intermediate node to a target node then stage 80 of the evaluating is responsive to: (i) a likelihood of an existence of a worm entity, (ii) a likelihood of a worm source to be infected by the worm entity, (iii) a likelihood of the intermediate node to be attacked by the worm source and be infected by the worm entity, (iv) a likelihood of the target node to be attacked by the intermediate node and be infected by the worm entity.

If, for example, a worm source is connected via multiple intermediate nodes to a target node then stage 80 of evaluating can include: (i) a likelihood of an existence of a worm entity, (ii) a likelihood of a worm source to be infected by a worm entity, (iii) a likelihood of each of the intermediates node to be attacked by a previous node (starting from the worm source) and be infected by the worm entity, (iv) a likelihood of the target node to be attacked by the intermediate node and be infected by the worm entity.

Stage 80 is followed by stage 85 of presenting, reporting or storing the results of stage 80. The results can be presented in a textual or graph manner.

Stage 85 is followed by stage 90 of identifying and optionally prioritizing security weaknesses of the network. The security weaknesses might relate to vulnerabilities and services in the network, possible network access, lack of or limitations of various protection mechanisms (firewalls, IPS devices, anti-virus software, worm real-time protection systems, etc.).

Stage 90 is followed by stage 100 of selecting security improvement actions.

It is noted that following such a selection method 8 can proceed to stage 10 during which the model of the network can be updated. This update can be followed by repeating various stages of method 8, including but not limited to that stage of evaluating.

Some of the stages in the described method are optional. Some optional additional steps are described in the text below and have not introduced into the figure for simplicity reasons. Receiving, Generating or Updating a Network Model—Stage 10

The network model represents the nodes, services, and vulnerabilities in the network, the topology of the network, and the configurations of the network devices (firewalls, routers, load balancer, IPS, Worm protecting systems, etc.). A computerized media that is used for holding the model use software entities for representing nodes, network interfaces of nodes, networks, services (applications) installed on nodes, vulnerabilities which exist on services of nodes.

Table 1 specifies data items which might be held in the model for these entities.

TABLE 1

Data items which might be held entities in the model

| Entity | Data items (partial list) |
|---|---|
| Node | Primary IP address (for layer 3 nodes) |
| | Name in the network |
| | Type (e.g., desktop, server, router, firewall, IPS) |
| | List of network interfaces |
| | List of services (applications) installed on the node |
| | Routing table (mainly for network devices) |
| | Access lists (for routers, firewalls, and nodes with local firewall) |
| | IPS rules of the node |
| | Local protection mechanisms installed on the node and their parameters and rules |
| Network interface | IP address |
| | Name |
| | Type |
| | Status (up/down) |
| Network | IP address and mask |
| | Name |
| | Type |
| | List of member network interfaces (of nodes)| |
| Service (application) | Name |
| | Vendor |
| | Version |
| | Ports which are used for remote access |
| | Vulnerabilities of the service |
| | Status (up/down) |
| Vulnerability instance | Catalog ID (such as CVE number) |
| | Reference to a description and model of the vulnerability |

The above model can be extended to include layer 2 network elements: layer 2 ports of devices, VLANs, connections in between layer 2 ports, etc.

Stage 10 of receiving, generating or updating a network model can involve utilizing a network server and multiple computer agents. The network server stores information while the agents gather network related information. The network server can be connected to the computer agents that in turn are installed in the modeled network or out of the network.

Figure 2:
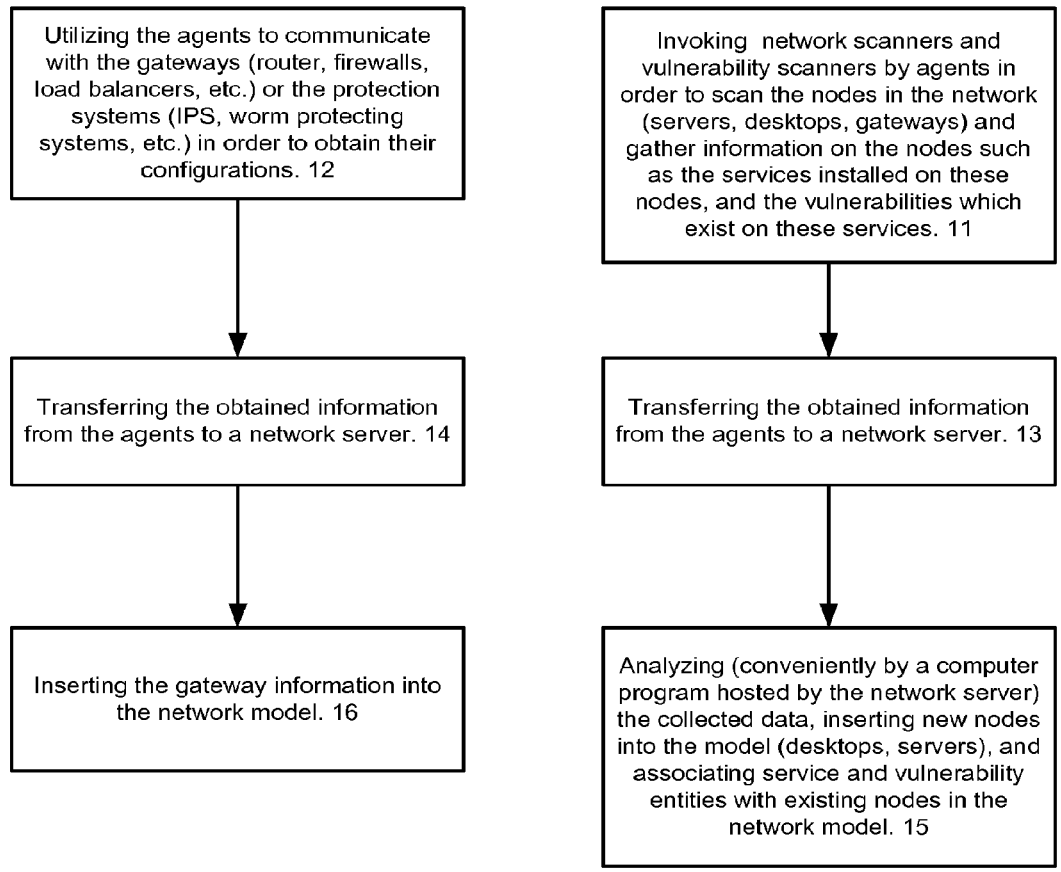
FIG. 2 is a flow chart of a stage for generating a network model, according to an embodiment of the invention.

Stage 10 may include: (i) collecting and importing configurations of gateways and protection systems associated with the network, and (ii) collecting data on the network nodes. Sub-stages 11-16 of stage 10, according to an embodiment of the invention, are illustrated in FIG. 2.

The collecting and importing of configurations of gateways and protection systems can start by stage 12 of utilizing the agents to communicate with the gateways (router, firewalls, load balancers, etc.) or the protection systems (IPS, worm protecting systems, etc.) in order to obtain their configurations. Additionally or alternatively, the agents can communicate with a repository or management system which already holds the configurations, and get the configurations from them. (b) The configurations are transferred to the server.

Stage 12 is followed by stage 14 of transferring the obtained information from the agents to a network server.

Stage 14 is followed by stage 16 of inserting the gateway information into the network model. Stage 16 may include parsing each of the configurations, extracting the information which is relevant for the model (name, primary, IP address network interfaces, routing tables, access lists, protection definitions, etc.) and inserting the information into the network model, building the topology of the model by creating networks and including in them the relevant network interfaces. This state can be implemented based on the IP addresses of the network interfaces, and other data gathered from the gateways.

The collecting of data on the network nodes may include stage 11 of invoking network scanners and vulnerability scanners by agents in order to scan the nodes in the network (servers, desktops, gateways) and gather information on the nodes such as the services installed on these nodes, and the vulnerabilities which exist on these services.

Stage 11 is followed by stage 13 of transferring the obtained information from the agents to a network server.

Stage 13 is followed by stage 15 of analyzing (conveniently by a computer program hosted by the network server) the collected data, inserting new nodes into the model (desktops, servers), and associating service and vulnerability entities with existing nodes in the network model.

The process above can be repeated on a regular basis to refresh the network model with up-to-date data: adding new discovered entities, removing entities which do not exist anymore, and updating the data items of existing entities.

In a system which implements method 8, the network model can be edited by a user by using a graphic user interface. Editing might include adding new devices, deleting devices, or changing the configuration of devices in the model.

Generating or Receiving Information Relating to Worms—Stage 40

The behavior of a worm is modeled to include the following stages: (i) Attacking accessible target hosts by exploiting certain vulnerabilities or using remote services on these target hosts. (ii) Infecting attacked hosts if conditions for transferring the worm entity to the target host are fulfilled (for example, a backward access from the attacked host to a certain service on the attacking host), and (iii) performing various activities on the target host, such as the installation of backdoor, reading or writing files, or participating in a DDOS attack.

A profile of a worm includes at least some of the following: attacking methods, infection requirements, worm files, worm effects, various propagation parameters, additional propagation methods and attributes.

Attacking methods include the methods which are used by the worm to attack target nodes, and achieve some level of control on the target. The specification of an attack method includes constraints on the attacked network nodes (type of network nodes, operating systems, etc), the ports and services which can be used for the exploit, vulnerabilities which should exit on the services, and the preconditions for exploiting the vulnerabilities (vulnerability preconditions might be specified separately as part of vulnerability modeling).

Infection requirements include conditions for transforming privileges achieved on the attacked target to a successful installation of the worm code on the target. The conditions might relate, for example, to the type of the target node and its operating system, configuration of the target node and software installed on it, the existence of a backward access through a certain port and service to the attacking host.

Worm files include the name type and location of the files which contains the worm code.

Worm effects are the effects of the worm on a network node and the network after succeeding to infect a network node.

Various propagation parameters can include the method implemented by the worm to decide on targets to be attacked and the attack rate.

Additional propagation methods include other methods than network propagation which can be used by the worms, such as mass mailing, the usage of Messenger or IRC, Web browser, Bluetooth, etc.

Worm attributes can include associated release date, severity, and current activity level in the world.

For example, the profile of a W32/Blaster worm can include the following information: (i) Attack method: exploiting remotely a vulnerability CA-2003-16 in Microsoft's DCOM RPC, installed on Windows XP (32 bit) or Windows 2000, via port 135/TCP, (ii) Infection requirements: backward access to port 69/UDP on the attacking host, (iii) Worms files: msblast.exe in %WinDir%\system32, (iv) Effects: Installation of a backdoor on port 4444/TCP, DDoS attack on specific sites and Network Load, (v) Additional propagation method: email.

A worm profile can be used (usually by omitting one or more information items) to represent groups of worms, and additionally or alternatively, to represent groups of potential worms.

Information pertaining to worm entities can be stored in various manners. For example, information pertaining to worms can be arranged in a dictionary of released worms. The dictionary can be generated and maintained in a central place, continuously holding a set of worms which are still active. This information can periodically or upon demand be transferred to systems that analyze models of specific networks. The same applies to information relating to potential worms.

Conveniently, when a new worm is discovered, the worm dictionary is updated and a worm profile is distributed to systems which are able to analyze worm attacks in network models.

This update can trigger an execution of stages 20, 60-100. For example, it can trigger the association of the worm with worm sources (such as worm sources included within a network or connected to the network). The association of a new worm to one or more worm sources can trigger a computation of the possibility of the new worm to attack the network, and the consequences and risks of these attacks. The results of the analysis can issue alerts to security personnel if the worm exposes the organization to significant risks. The system might point on the weaknesses that their removal will reduce the risk of the new worm.

Conveniently, when a new worm profile is received or generated or even when a likelihood of occurrences of a potential worm exceeds a certain threshold a potential worm dictionary is updated and a potential worm profile is distributed to systems which are able to analyze worm attacks in network models. This can trigger an execution of stages 50, 60-100.

Generating or Receiving Information Relating to Potential Worms—Stage 50

A profile of a potential worm can define a single worm but usually a single profile can define multiple potential worms.

A profile of a potential worm is usually less detailed than a profile of a worm It can include few of the following: attacking methods, infection requirements, worm files, worm effects, various propagation parameters, additional propagation methods and attributes.

Additionally or alternatively, even if these mentioned above details exist in a potential worm profile they are less detailed.

Accordingly, a profile of potential worms can include many of the properties unspecified.

Conveniently, a profile of a potential worm can include information representative of an estimated likelihood or likelihood level for the release of a currently potential worm of that profile in the near future (within some predefined period of time)

It is possible to distinguish between two potential worm profiles: those of potential worms that will exploit already published vulnerabilities, and those of potential worms that will exploit vulnerabilities which have not-published yet (zero-day worms).

A profile of potential worms that will exploit already published vulnerabilities typically specifies a vulnerability which the potential worm will be able to exploit.

The profile might not include properties such as the infection requirements, the worm effects, and the propagation attributes, assuming worst case behavior: a rapid spreading worm which attacks and infects any accessible target that has the specified vulnerability.

The attacking methods included in this profile might include a set of vulnerabilities which can be exploited (rather than a single vulnerability), including the statement that any published vulnerability of a specified characteristic (e.g. service or the port) can be exploited by the worm.

For example, a profile of a potential worm that indicates an exploitation of vulnerability CA-2003-16, covers W32/Blaster and any other worm that is able (or be able) to exploit that vulnerability.

Simulating potential worms that exploit published vulnerabilities can help in identifying those vulnerabilities which impose high risk to the network, enabling to mitigate the risky vulnerabilities on time.

A profile of potential worms that will exploit vulnerabilities which have not-published yet (zero-day worms) typically specifies the port and, alternatively or additionally, the service which are used by the worms for attacking target hosts. An example for a profile might be a "zero-day Apache worm"—representing all the worms that will be able to exploit vulnerabilities of Apache (including those which have not-published yet).

Simulating zero-day worms enables organization to identify and fix security flaws in their network access, reducing by that the risk of zero-day worms.

The number of hypothetical potential worm profiles might be huge (there are thousand of published vulnerabilities, and thousands of services and ports). As a result, evaluating the network risk related to each of the hypothetic worm profiles is of a high complexity. On the other hand, evaluating sporadically few specific profiles might miss risky potential worms. An optional goal of the process which generates profiles of potential worms is to create and maintain a set of potential worm profiles that have a reasonable likelihood to represent in the future real worms. Each potential worm profile in the set is associated with a likelihood level. The likelihood level might simply be a high-medium-low classification, or an estimated probability that a worm which matches the profile will be published in the future (within a specified period of time).

For potential worms which exploit already published vulnerabilities, the profile generation process can focus on vulnerabilities which are seem "attractive" to worm developers. The process can be done by security experts, or by applying computerized methods which consider various attributes of vulnerabilities, or by combination of the two. Vulnerability attributes which might be considered in the process are: (i) The effect of the vulnerability (for example, consider only vulnerabilities that enable achieving control), (ii) The commonality of the vulnerability in the world (how common is it in the world), (iii) The commonality in the world of the services and operating system on which the vulnerability resides, (iv) The existence of an exploit for the vulnerability, (v) The likelihood to succeed in the exploit, (vi) The age of the vulnerability. Typically the likelihood for the release of a worm which exploits the vulnerability increases with the age of the vulnerability, up to some predefined (learnt) age, and then starts to decrease, (vii) The likelihood level of the profile can be a weighted sum or some other function of the above attributes. Potential worm profiles with a likelihood level below a specified threshold, might not be generated.

For potential zero-day worms (relate to service or port rather than published vulnerabilities) the potential worm profile generation process focuses on services or ports which seem "attractive" to worm developers. As before, the process can be done by security experts, or by applying computerized methods which consider various attributes of the service, or by combination of the two.

Service attributes which might be considered are: (i) The commonality of the service, (ii) The exposure level of the service to external networks (i.e., is the service is accessible to external networks?), (iii) The exposure level of the service to internal nodes (i.e., is the service is accessible from relatively large number of internal nodes?), (iv) The vulnerability level of the service based on history (for example, how many severe vulnerabilities the service had in the last year), (v) Previous exploits of the service by worms.

The computation of the likelihood level of the potential worm profile can be a weighted sum or on some other function of the above attributes. Potential worm profiles with a likelihood level below a specified threshold, might not be generated.

The value of the properties mentioned above can be determined (or estimated) by using information from security and network research centers or by gathering statistics from network models analyzed by the system.

A graphic user interface or a dedicated file format can be used for manual specification of worm entities.

Receiving, Defining or Updating Worm Source Information—Stage 20

A worm source is a network node, a group of network nodes, or an entry point into the network which might be the source of a worm attack on the network. Examples for worm sources are: the Internet, the network of other organization or group which is connected to the examined network, an internal network of desktops, a network which might host laptops, and a wireless network.

A worm source might be associated with attributes regarding the nodes the worm source represents (e.g. Internet, Internal desktops network, Internal network with laptops), the number of the represented nodes, the services and capabilities of the nodes (e.g., email access, web access), their protection mechanisms (e.g., the existence of anti-virus software, or even the configurations of anti-virus software), and an estimated likelihood for the success of a worm to infect the worm source (provided it exists). These attributes can be specified manually by a user of the system or deducted automatically when detailed enough information exists in the model.

In a system which implements the method, the worm sources can be stored as part of the network model.

In order to evaluate the ability of worm entities to attack the network, the worm entities have to be associated with worm sources. The worm entities associated with the worm sources can be derived from at least one of the following: (i) A predefined dictionary of worm entities, (ii) manually defined worm entity profiles, (via a GUI or file in dedicated format), (iii) automatically generated worm entity profiles (the generation can be executed for the analysis of the network model).

The association of can be responsive to attributes of the worm sources, attributes of worm entities (for example additional propagation methods), and user preferences.

The association can be responsive to the following: (i) worm sources which represent external networks (e.g., the Internet or the network of other connected organization) can include any worm entity, (ii) worm sources which represent internal networks which might host laptops can include any worm entity, (iii) worm sources which represent desktop networks can include worm entities which can propagate using mail or web access.

The association can include associating worm sources with potential worms (variations: zero-day worms, or worms that related to published vulnerabilities) or associating worm sources with worms.

Since the complexity of the worm attack analysis directly depends on the number of worm entities associated with the worm sources, the size of this set should usually be limited.

For already published worms, parameters such as the worm age, the worm severity or current activity level might be used to rank the importance of the worm and for limiting the association of worms with worm sources to worms that match the criteria or are ranked as important enough. A constraint on the size of the list can also be specified. When the analysis of worm attacks on the network is performed continuously, it is usually important to associate with worm sources worms that have just published is (i.e., relating a high rank to young worms).

For profiles of potential worms the selection or ranking criteria might include: (i) the likelihood level of the occurrence of the potential worm, and (ii) the relevancy of the potential worm to the particular network which is examined. For example, potential worms which relate to vulnerabilities or services which are common in the examined network or accessible from the worm sources can get a higher rank (or even be generated if not exits in the profile set).

As mentioned above, potential worms can be generated automatically by a computer program for the analysis of the examined model.

A potential worm generated in that way might relate to combination of vulnerabilities or combination of services which can be used for attacking efficiently the examined network from worm sources. To discover such risky combinations, an analysis of the worm profile is performed. For example, such an analysis can discover that a potential worm located in the Internet and can attack both http and SQL potential vulnerabilities, could cause a significant damage to the analyzed network. Such an analysis can be done, for example, by associating a "generic worm" with the attack sources—a potential worm that is able to exploit any potential vulnerability of any service.

Then, the propagation of the generic worm is simulated, creating an attack graph which describes the possible attack paths and the actual services and vulnerabilities which could be used for the attack (propagation) steps. An analysis of the attack graph is performed in order to find a limited combination of services or a limited combination of vulnerabilities which achieve large number of infected nodes.

A technique which can be used for performing such graph analysis might be based on counting the number of infected nodes, achieved by each identified combination of services (or vulnerabilities), where the number of services (or vulnerabilities) in each combination is limited. Other possible techniques include formalizing the analysis as an optimization problem, using, for example, genetic algorithms to find solutions.

Determining the Possible Worm Attacks—Stage 70

Determining the possible worm attacks (also referred to worm attack analysis) can be done by applying a worm attack simulation to a model of the network (the basis for the worm attack simulation can be for example, the technique illustrated in U.S. Pat. No. 6,952,779 of Cohen et al, which is incorporated herein by reference).

The worm attack simulation starts at the worm sources. The simulation process applies for each worm entity, associated with the worm sources, only attack actions which can be performed by the represented worms. All the targets (which might be possible for attack) are examined for the attack actions. When an attack action of a worm entity involves exploiting vulnerability on a target node, various conditions are checked by the simulation using the network model, and simulation data: (i) The existence of the vulnerability on the target node, (ii) The possibility of the (malicious) access from the attacking host to the relevant service on the target, and (iii) The fulfillment of exploitation required preconditions the vulnerability.

The check of (malicious) access to the target node considers the topology of the network, the routing rules and the filtering rules of network devices, and the protection rules of IPS devices and worm protection systems.

When the attack action of a potential worm relates only to a service (zero-day worms), the conditions which are checked (using the model) include the possibility to access the service on the target node, and the existence of the service on the target node. Achieving a worm infection status on a target node requires the fulfillment of the attack action preconditions (as explained above) and the fulfillment of the infection requirements (as specified for the worm entity), such a certain backward access. Required backward access to some service on the attacking host can be verified by analyzing the access possibility in the model. Once a worm entity achieved a worm control status on a host (i.e., the host is infected by the worm), it can: (i) achieve the worm effects as specified in the model of the worm entity, and (ii) perform attacking actions on other hosts.

The attack simulation generates an attack graph. The attack graph records using nodes and links the states of services (worm achievements) and the transition (steps) which enable these worm achievements.

Determining Security Metrics Related to Worm Attacks— Stage 80

Various metric can be used for measuring the security status of a network against attack of potential worms: (i) Number (or ratio) of hosts which can be infected, (ii) Number (or ratio) of worm entities which can successfully attack the network, (iii) Risk imposed by worm attacks, taking in account likelihood and potential impact.

Such metric can relate to the whole network, considering all worm entities, from all worm sources, or be more specific relating to specific areas in the network (e.g., locations, business units, logical groups of network or hosts), specific worm entities, and specific worm sources.

Associating metrics with the whole network supplies an overview on the worm related security status of the organization which use the network. Associating metrics with more specific entities enables comparing between sub-areas in the network, between worm entities and worm sources. Such a comparison might help focusing on the most severe security problems. Each such metric can be used as a basis for continuous tracking on security status, examining changes and trends along time, checking the effect of security improvement activities, and examining the consequences of network changes.

The number of hosts which can be infected or the number of worm entities which can infect the network is a straight-forward outcome of the worm attack analysis.

The risk imposed by a worm entity might include several components: (i) Business assets imposed risk—the risk to business assets resulted of worm attacks (successful attacks on hosts of the business assets). Examples are the infection of web servers, application servers, and data base servers. (ii) Network infrastructure risk—the risk to the network infrastructure as a result of worm attacks. When the bandwidth consumption in the network increases as a result of worm activity, the elements of the network infrastructure might collapse or work very slowly causing DOS (denial of service) damage to clients of the infrastructure. (iii) Worm infection risk—is related to the recovery costs. The number and the type of the infected hosts affect the costs involved with cleaning the infected hosts and returning the network to a normal operation.

In general a risk is the multiplication of the potential damage (the impact) by the likelihood to be damaged. The magnitude of the damage is different from case to case and has to be specified by the user (or should be deducted from some input of the user). For example, the impact a security loss l (where l can be C, I, or A; C—Confidentiality, I—Integrity, A—Availability) of a business asset a can be estimated by the user based on its importance and the kind of information that is held on it. Let us denote that value as impact(a,l). Similarly the user can estimate the damage involved with a crash of several hours of its network infrastructure, and the cleaning cost of a network node infected by a worm.

Estimation for the likelihood of a network node to be infected can be computed, taking in account various more basic likelihood estimations such as: p_exist(w), p_source(s, w), and p_infect (h, g, w).

Probability p_exist(w) is the likelihood of a worm entity w to exist and be active. This value can be supplied with the worm dictionary. For worms which have already been released and published this value might be based on the activity level of the worm (is supposed to decrease for old worms). For profiles of potential worms the value expresses the belief that a worm which matches the profile will be released in the near future (within a certain period of time).

Probability p_source(s, w) is the likelihood of the worm source s to be infected by worm entity w, provided w exists. This likelihood is either supplied by the user or deducted from various parameters such as the counter measures installed on the hosts of the worm source. For the worm source Internet which represents the Internet for example, p_source(Internet, w) can be assumed as 1. For a worm source Internal_desktops which represents an internal network of desktops with mail clients, p_source(Internal_desktops, w) where w can be spread using mass mailing will be smaller taking in account that a user which uses the desktop has to take some active actions to enable the infection. The number of desktops in the network as well as the existence or inexistence of counter measures (such as anti-virus) on the desktops can be taken in account in estimating that likelihood.

Probability p_infect (h, g, w) is the likelihood that a host or a host group h which is already infected by a worm entity w will attack and infect a target host g.

If the conditions for infecting g from h are not matched (for example, the access is not possible, the service or vulnerability does not exist on the target, etc.) the likelihood is zero. Otherwise, the likelihood is estimated using either general previous statistics on infection likelihood, or is computed using more basic attributes such as: (a) the assumed likelihood of g to be in the target addresses of w on h (might depend for example on the distance between the IP addresses of h and g, and on assumed propagation attributes). (b) The assumed likelihood that required unpublished vulnerabilities will exist on the service (for worm profiles), (c) The assumed success rate of the exploits, and (d) The assumed success rate of the infection phase.

The likelihood of a host t to be infected by worm entity w assigned to worm source s, depends on p_exist(w), p_source (s, w), and on the p_infect (h, g) values of the attack steps required by the worm for infecting t starting at s. If for example, the only way of the worm resides on a worm source s to infect t is to infect first host h and then infect t by attacking it from h, the likelihood of t to be infected by w starting at s, denoted by p_infected (t, s, w), can be computed as follows:

$$p\_infected(t,s,w)=p\_exist(w)*p\_source(s,w)*p\_infect(s,h)*p\_infect(h,t).$$

When more than one worm attack path is possible from s to t, the likelihood of the attack (propagation) path which achieves the maximal infection likelihood of the target can be used as a lower bound for the infection probability of t by w. A lower bound for p_infected (t, w) the likelihood of t to be infected by w independently of a particular worm source, can be computed by taking the maximal p_infected (t, s, w) for all worm source s. This value can be used as a rough estimation for p_infected (t, w).

A more precise computation (but more complex) can use techniques from Bayesian networks.

It is noted that p_infected (t, w) can be the basis for several impact computations. The likelihood of a security loss l (where l can be C/I/A) caused by a worm entity w to a business asset a, denoted by p_security_loss (a, l, w), depends on the infection probabilities of the hosts of the business asset and the assumption on the effects of the worm. For example, if w can cause l, take the maximum likelihood of a host of the business asset to be infected by w.

The business assets imposed risk of worm entity w can be calculated for example by:

$$\Sigma_{a,l} p\_security\_loss(a,l,w)*impact(a,l)$$

The multiplication supplies estimation for the risk of a security loss l to business asset a of worm w. That value is summed for all security losses of all the business assets.

The infection (recovery) risk can be computed by:

$$\Sigma_t p\_infected(t,w)*recovery\_cost(t)$$

The multiplication supplies estimation for the risk associated with recovery costs of target host t. This value is summed for all hosts that cane be infected. Note that the recovery costs should not necessarily supplied for each individual host. They can be estimated for the different categories of hosts exist in the network.

The network infrastructure impact can be estimated in various ways. One simplistic way is to deduct the bandwidth consumption of the network from the number of possible infected hosts. For example, the infection of n nodes in the network will cause to a worm bandwidth consumption x. The bandwidth estimation might also associate with ports or service (e.g., the estimated http or port 80 bandwidth consumption is y). The number of infected hosts can be simply the number of the infected hosts found by the attack analysis of worms, or the expectancy (the sum of the likelihoods to infect these hosts).

A more complex computation is based on performing access analysis from every infected host in this model (this can be done by enhancing the access analysis which is performed as part of the worm attack analysis, or as a separate process). Each network device which encountered during the access analysis is will potentially receive or transfer worm generated packets. The number of these packets is in the worst case is based on the number of IP addresses allowed to arrive at the devices from the attacking host by the filtering device. Assumption on the propagation policy (target acquisition) typically reduces that number.

It is possible to accumulate and record for each network device the number of packets which are expected to arrive from the different infected devices. This number supplies an estimate for the expected consumed bandwidth on the device as a result of worm attacking actions.

A similar analysis can be done for the infection phase—the transfer of the worm entity to the targets. Time considerations, such as the expected propagating time of the worm to the infected hosts, and the expected size of the packets can also be considered as part of the bandwidth consumption estimation. By comparing the estimated consumed bandwidth with the available bandwidth of the devices (or of ports of the devices), can supply indication to the potential load on each device and on the likelihood for a denial of service as a result of an overload.

The risk for the network infrastructure can be estimated by multiplying for each network device d the likelihood for a denial of service as a result of a worm attack (of worm entity w) by the expected damage to the organization (denial of service, recovery), and summing all these values for all the devices:

$$\Sigma_d p\_DOS(d,w)*device\_DOS\_damage(d).$$

Presenting, Reporting or Storing the Results of a Worm Attack Analysis—Stage 85

The following results of the worm attack analysis (worm attack determination) can be presented to the user of the system: (i) The nodes in the network that can be infected by each worm entity that has been simulated, (ii) The nodes in the network that can be infected by worm attacks from each of the worm sources, (iii) The estimated load or overload of each network device as a result of bandwidth consumption, and the potential for denial of service (DOS) as a result of that overload, (iv) The propagation steps of a worm entity, (v) Explanation for how the worm entity was able to perform an attack or propagation step—the access, services, and vulnerabilities that enabled the step, and transitions through filtering and protection devices that have not prevented the propagation step, and (vi) Security metrics.

The mentioned above information can be presented: (a) Textually—listing the nodes that could be infected in the first step, then the nodes that could be infected in the second step, etc., (b) Graphically, on a map of the network, by presenting for example an animation which shows the infected nodes in each step (with backward and forward user control options for adding and removing steps), (c) Using a graphic representation of the attack graph. In one possibility for that presentation: possible attack actions of worms are connected with (1) nodes that represent previous worm achievements that enabled the attack actions—the predecessors, and (2) with the nodes that represent the consequences or achievements of the worm attack actions—the successors. The graphic representation support various level of aggregations of actions and achievements (relating for example to achievement on a network or location rather than a single host).

Identifying and Prioritizing Security Weaknesses—Stage 90

Security weaknesses might be of several types: (i) A vulnerability which exists in the network and might be exploited by a worm entity in order to attack the network, (ii) An access link—an access which is possible between a source and a target in the network and enables worm entity propagation. The source and the target might be two nodes or two node groups in the network. The possibility of a worm entity to use an access link for propagation might be due to more basic causes or weaknesses (a) Missing or not tight enough access filtering rules between the source and the target, (b) Missing or not tight enough prevention rules of IPS devices or real time worm protection mechanisms, or a limited ability of these mechanisms, (iii) The lack of anti-virus or other protection mechanism installed on the worm sources.

The analysis of potential worm attacks enables to identify and prioritize those weaknesses that contribute to the risk. The computation process which is done for that analysis can analyze the attack graph and associate a risk rank with each identified security weakness.

One particular method for doing that is a follows: (i) Use the attack graph generated on analyzing the potential worm attacks. (ii) Compute for each attack graph node an imposed risk (denoted by imposed_risk)—the maximal risk imposed by an attack path that includes the node.

This computation can start by computing for each node n p_arrive(n)—the maximum likelihood to arrive at the node using a single path which starts at an attack starting point. This can be done by using a forward propagation algorithm which starts at the attack starting points, and updates the p_arrive of each encountered node to be the local success likelihood of the node (p_success) multiplied by the maximum of the p_arrive value of its predecessors. A modification to the p_arrive value of a node requires updating the p_arrive value of its successors.

Computing for each node n relative_imposed_risk(n) the maximal risk it can impose using a singe path, assuming that the node itself was achieved.

This can be done by using a backward propagation algorithm which starts at attack end points, and updates the relative_imposed_risk of each encountered node to be the local success likelihood of the node multiplied by the maximum of the relative_imposed_risk value of its successors. A modification to a the relative_imposed_risk value of a node requires updating the relative_imposed_risk value of its predecessors.

Update the imposed_risk of each node n to be p_arrive(n) *relative_imposed_risk(n)/p_success(n).

The computation is followed by associating the imposed_risk computed for nodes with the security weaknesses they might represent: (i) Vulnerability instance—when the node in the attack graph represents the exploitation of vulnerability, associate the imposed_risk of the node with the corresponding vulnerability instance. (ii) Access link—when the node represents access to a service which can be used by a potential worm for infecting a host, associate the imposed_risk of the node with the access links that enables the access. (iii) Worm source weaknesses—when the node represents a worm starting point, the imposed_risk of the node can be associated with known weaknesses of worm source such as lack or limited protection mechanisms.

Selecting Security Improvement Actions—Stage 100

Different type of security improvement actions can be performed, such as mitigating vulnerabilities, adding access filtering rules to network devices, changing the configurations of prevention systems (IPS, anti-virus, worm real-time prevention systems), etc.

The system which implements the method can present to its users the weaknesses associated with a risk rank. The selection of the weaknesses to be handled first can be guided by that information. The way a risk rank can be associated with a weakness such as vulnerability or access link has been explained in the previous section.

For access links, the system can present in addition to the risk rank, the access routes through network and prevention devices which enabled the access. The route information might include the filtering rules of firewalls that allowed the access, or data that might help understanding why a prevention device has not prevented the malicious access through the link.

Examining the Effect of a Security Improvement Action

Suggested security improvement can be evaluated using the model. The suggested changes can be performed on the model (or on a "what-if" copy of the model): marking vulnerabilities as mitigated, changing access lists of filtering devices, adding prevention rules or changing prevention parameters of prevention systems, adding a filtering or prevention device, etc. The worm attack analysis, including the computation of the security metrics, can be re-computed on the changed model. The results can be examined by the user and be compared to the previous security picture, in order to assess the affectivity of the improvement actions, and decide whether to implement the changes in the real network or to examine alternative changes.

Examining the Effect of a Network Change

The method enables examining the implication of proposed network changes to the worm related security metrics of the network. The change is performed first on the model. Its implications on the ability of worms or potential worms to attack the network are examined. The change is approved if it does not cause to a significant degradation in the worm related security metrics.

Figure 3:
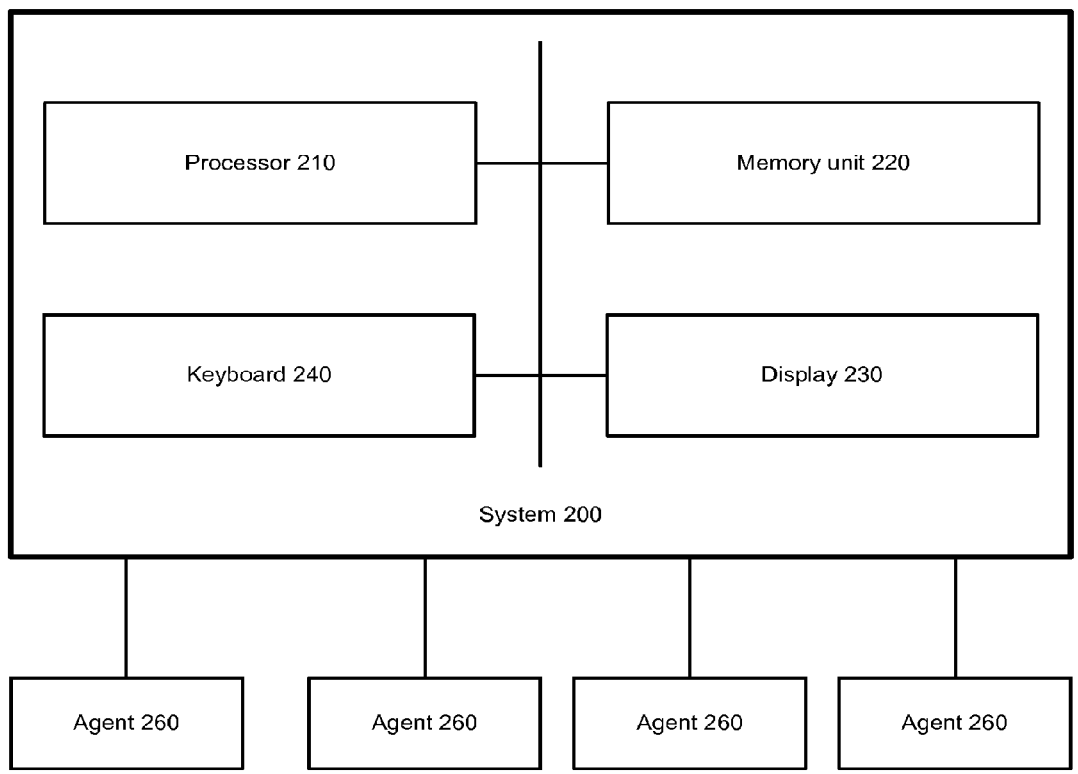
FIG. 3 illustrates a system according to an embodiment of the invention.

FIG. 3 illustrates system 200 according to an embodiment of the invention.

System 200 includes a processor 210, memory unit 220, display 230, and keyboard 240. It is noted that other main machine interface units can be included in system 200 and that the various components of system 200 can be located in proximity to each other, remotely located from each other and the like.

System 200 can execute various stages of method 8. Conveniently, memory unit 220 is adapted to store information representative of a network and of worm entities. Processor 210 is adapted to: associate, in response to the information representative of a network and of worm entities, between worm entities and potential worm sources to provide associated worn sources; determine potential worm attacks that start from the associated worm entities; and evaluate at least one potential worm attack security metric associated with the potential worm attacks.

System 200 (can be a network server) that can be connected to multiple agents 260 that collect information representative of a network that is being examined.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A computer program product comprising a non-transitory computer usable medium including a computer readable program, wherein the computer readable program when executed on a computer causes the computer to: generate information representative of worm entities; associate, in response to information representative of a network and of the worm entities, between worm entities and potential worm sources to provide associated worm sources; wherein the association is triggered when a new worm profile is received, when a new worm profile is generated, and when a likelihood of occurrences of a potential worm exceeds a certain threshold; determine potential worm attacks that start from the associated worm sources, by applying a worm attack simulation to a model of the network that represents at least nodes, vulnerabilities and topology of the network, wherein the non-transitory computer usable medium is used for holding the model of the network and uses software entities for representing network components; and evaluate at least one potential worm attack security metric associated with the potential worm attacks.

2. The computer program product according to claim 1, wherein the evaluating of security metric relates to the number of hosts which can be infected.

3. The computer program product according to claim 1, wherein the computer readable program when executed on a computer causes the computer to compute the risk imposed by the worm entities to business assets.

4. The computer program product according to claim 3, wherein a computing of the risk imposed to business assets involves multiplication of a potential of damage to occur due to the risk and an estimated likelihood of an occurrence of the damage.

5. The computer program product according to claim 4, wherein the computer readable program when executed on a computer causes the computer to estimate the likelihood in response to (i) a likelihood of an existence of a worm entity, (ii) a likelihood of a worm source to be infected by a worm entity, (iii) a likelihood of each of the intermediate nodes to be attacked by the worm source and be infected by the worm entity, (iv) a likelihood of the target node to be attacked by at least one of the intermediate nodes and be infected by the worm entity.

6. The computer program product according to claim 1, wherein the computer readable program when executed on a computer causes the computer to identify security weaknesses in response to the at least one potential worm attack security metric.

7. The computer program product according to claim 1, wherein the computer readable program when executed on a computer causes the computer to prioritize the identified security weaknesses.

8. The computer program product according to claim 1, wherein a determining of potential worm attacks comprises evaluating a propagation of worm entities through network nodes while using vulnerabilities of these network nodes and evaluating possible infection of target nodes coupled to network nodes through which the worm propagates.

9. The computer program product according to claim 1, wherein the computer readable program when executed on a computer causes the computer to select and evaluate security improvement actions where the security improvement actions can relate to mitigating vulnerabilities, adding access filtering rules of network devices, or changing the configurations of prevention systems.

10. The computer program product according to claim 1, wherein the computer readable program when executed on a computer causes the computer to select security improvement actions using a rank associated with weaknesses to be prevented by the security improvement actions.

11. A method, comprising generating information representative of worm entities; associating, in response to information representative of a network and of the worm entities, between worm entities and potential worm sources to provide associated worm sources; wherein the associating is triggered when a new worm profile is received, when a new worm profile is generated, and when a likelihood of occurrences of a potential worm exceeds a certain threshold; determining potential worm attacks that start from the associated worm sources, by applying a worm attack simulation to a model of the network that represents at least nodes, vulnerabilities and topology of the network, wherein the non-transitory computer usable medium is used for holding the model of the network and uses software entities for representing network components; and evaluating at least one potential worm attack security metric associated with the potential worm attacks.

12. The method according to claim 11, wherein the evaluating of security metric relates to the number of hosts which can be infected.

13. The method according to claim 11, comprising computing the risk imposed by the worm entities to business assets.

14. The method according to claim 13, wherein the computing of the risk imposed to business assets involves multiplication of a potential of damage to occur due to the risk and an estimated likelihood of an occurrence of the damage.

15. The method according to claim 14, comprising estimating the likelihood in response to (i) a likelihood of an existence of a worm entity, (ii) a likelihood of a worm source to be infected by a worm entity, (iii) a likelihood of each of the intermediate nodes to be attacked by the worm source and be infected by the worm entity, (iv) a likelihood of the target node to be attacked by at least one of the intermediate nodes and be infected by the worm entity.

16. The method according to claim 11, comprising identifying security weaknesses in response to the at least one potential worm attack security metric.

17. The method according to claim 11, comprising prioritizing the identified security weaknesses.

18. The method according to claim 11, wherein a determining of potential worm attacks comprises evaluating a propagation of worm entities through network nodes while using vulnerabilities of these network nodes and evaluating possible infection of target nodes coupled to network nodes through which the worm propagates.

19. The method according to claim 11, comprising selecting and evaluating security improvement actions where the security improvement actions can relate to mitigating vulnerabilities, adding access filtering rules of network devices, or changing the configurations of prevention systems.

20. A system for evaluating potential attacks of worms, the system includes: a memory unit adapted to store information representative of a network and of worm entities; and a processor adapted to: associate, in response to the information representative of a network and of worm entities, between worm entities and potential worm sources to provide associated worm sources; wherein the association is triggered when a new worm profile is received, when a new worm profile is generated, and when a likelihood of occurrences of a potential worm exceeds a certain threshold; determine potential worm attacks that start from the associated worm entities by applying a worm attack simulation to a model of the network that represents at least nodes, vulnerabilities and topology of the network, wherein computerized media that is used for holding the model of the network use software entities for representing network components; and evaluate at least one potential worm attack security metric associated with the potential worm attacks.

* * * * *